United States Patent
Rodriguez-Natal et al.

(10) Patent No.: US 12,068,965 B2
(45) Date of Patent: Aug. 20, 2024

(54) PASSING APPLICATION NETWORK METADATA TO NETWORK CONTROLLERS USING SERVICE REGISTRIES

(71) Applicant: Cisco Technology, Inc., San Jose, CA (US)

(72) Inventors: Alberto Rodriguez-Natal, Redwood City, CA (US); Steven William Wood, Ottawa (CA); Ding Bai, San Jose, CA (US); Fabio R. Maino, Palo Alto, CA (US); Ramanathan Lakshmikanthan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/494,441

(22) Filed: Oct. 5, 2021

(65) Prior Publication Data
US 2022/0029921 A1  Jan. 27, 2022

Related U.S. Application Data

(63) Continuation-in-part of application No. 16/983,346, filed on Aug. 3, 2020, now Pat. No. 11,665,095.

(60) Provisional application No. 63/155,639, filed on Mar. 2, 2021, provisional application No. 62/979,807, filed on Feb. 21, 2020.

(51) Int. Cl.
*H04L 47/20*    (2022.01)
*H04L 47/24*    (2022.01)

(52) U.S. Cl.
CPC .............. *H04L 47/20* (2013.01); *H04L 47/24* (2013.01)

(58) Field of Classification Search
CPC .......... H04L 47/20; H04L 47/24; H04L 67/61
See application file for complete search history.

(56) References Cited

U.S. PATENT DOCUMENTS 10,999,326 B1 * 5/2021 Pollitt ..................... H04L 63/20
11,032,389 B1 * 6/2021 Chaubey ............... H04L 45/742
(Continued)

OTHER PUBLICATIONS

Apostolopoulos, John, et al., "Cloud-Native SD-WAN: The WAN Your Kubernetes Applications Deserve," downloaded from https://blogs.cisco.com/networking/introducing-the-cloud-native-sd-wan-project, Published Aug. 20, 2020, 8 pages.

(Continued)

*Primary Examiner* — Cheikh T Ndiaye
(74) *Attorney, Agent, or Firm* — Lee & Hayes, P.C.

(57) ABSTRACT

Techniques for obtaining application network metadata from a service registry so that a network routing policy may be derived for traffic associated with the application are described herein. The techniques may include receiving, at a service registry, network metadata associated with traffic of an application hosted by a scalable application service platform. The techniques may also include obtaining, by a controller of a network and from the service registry, the network metadata associated with the traffic of the application. Based at least in part on the network metadata, the controller may determine a routing policy that is optimized for sending the traffic through the network. Additionally, the controller may send an indication of the routing policy to a node of the network or otherwise provision the network such that the traffic of the application is sent through the network according to the routing policy.

20 Claims, 5 Drawing Sheets

(56) References Cited

U.S. PATENT DOCUMENTS

| | | | |
|---|---|---|---|
| 2009/0055888 A1 | 2/2009 | Little | |
| 2016/0164826 A1* | 6/2016 | Riedel | H04L 43/0876 |
| | | | 709/223 |
| 2016/0308905 A1* | 10/2016 | Stiekes | H04L 63/166 |
| 2017/0230467 A1 | 8/2017 | Salgueiro et al. | |
| 2019/0394286 A1* | 12/2019 | Chunduru Venkata | ..................... |
| | | | H04L 41/0843 |
| 2020/0322262 A1* | 10/2020 | Maino | H04L 67/04 |
| 2020/0366574 A1* | 11/2020 | Schubert | G06F 9/465 |
| 2020/0366697 A1* | 11/2020 | Vittal | G06F 9/468 |
| 2020/0366759 A1* | 11/2020 | Sinha | H04L 41/40 |
| 2020/0396141 A1* | 12/2020 | Sundararajan | H04L 45/70 |
| 2020/0413283 A1 | 12/2020 | Shen et al. | |

OTHER PUBLICATIONS

Tato, Genc, "Lazy and Locality-Aware Building Blocks for Fog Middleware: A Service Discovery Use Case," tel.archives-ouvertes. fr, published May 12, 2020, 126 pages.

SunSince90, "Service Registry," downloaded Apr. 20, 2021, from GitHub, published Jan. 22, 2021, 5 pages.

The International Search Report and Written Opinion for PCT Application No. PCT/US22/16607, mailed May 19, 2022. 19 pages.

PCT International Preliminary Report on Patentability mailed Sep. 14, 2023 for PCT Application No. PCT/US22/16607, 14 pgs.

\* cited by examiner

200 →

```
┌─────────────────────────────────────────────────────────────┐
│  RECEIVE, AT A SERVICE REGISTRY THAT IS ASSOCIATED WITH A   │
│   SCALABLE APPLICATION SERVICE PLATFORM, NETWORK METADATA   │
│  ASSOCIATED WITH TRAFFIC OF AN APPLICATION HOSTED BY THE    │
│        SCALABLE APPLICATION SERVICE PLATFORM                │
│                           202                               │
└─────────────────────────────────────────────────────────────┘
                              │
                              ▼
┌─────────────────────────────────────────────────────────────┐
│  OBTAIN, BY A CONTROLLER OF A NETWORK AND FROM THE SERVICE  │
│   REGISTRY, THE NETWORK METADATA ASSOCIATED WITH THE        │
│              TRAFFIC OF THE APPLICATION                     │
│                           204                               │
└─────────────────────────────────────────────────────────────┘
                              │
                              ▼
┌─────────────────────────────────────────────────────────────┐
│   DETERMINE, BY THE CONTROLLER AND BASED AT LEAST IN PART   │
│   ON THE NETWORK METADATA, A ROUTING POLICY THAT IS         │
│   OPTIMIZED FOR SENDING THE TRAFFIC THROUGH THE NETWORK     │
│                           206                               │
└─────────────────────────────────────────────────────────────┘
                              │
                              ▼
┌─────────────────────────────────────────────────────────────┐
│  SEND AN INDICATION OF THE ROUTING POLICY TO A NODE OF THE  │
│  NETWORK SUCH THAT THE TRAFFIC OF THE APPLICATION IS SENT   │
│      THROUGH THE NETWORK ACCORDING TO THE ROUTING POLICY    │
│                           208                               │
└─────────────────────────────────────────────────────────────┘
                              │
                              ▼
┌─────────────────────────────────────────────────────────────┐
│   RECEIVE, AT THE NODE OF THE NETWORK, TRAFFIC OF THE       │
│   APPLICATION THAT IS TO BE SENT THROUGH THE NETWORK        │
│                           210                               │
└─────────────────────────────────────────────────────────────┘
                              │
                              ▼
┌─────────────────────────────────────────────────────────────┐
│   SENDING THE TRAFFIC THROUGH THE NETWORK ACCORDING TO      │
│                       THE POLICY                            │
│                           212                               │
└─────────────────────────────────────────────────────────────┘
```

FIG. 2

PASSING APPLICATION NETWORK METADATA TO NETWORK CONTROLLERS USING SERVICE REGISTRIES

RELATED APPLICATIONS

This application is a continuation in part of U.S. patent application Ser. No. 16/983,346, filed on Aug. 3, 2020, which claims priority to U.S. Provisional Patent Application No. 62/979,807, filed on Feb. 21, 2020, the entire contents of each are incorporated herein by reference and for all purposes. This application further claims priority to U.S. Provisional Patent Application No. 63/155,639, filed on Mar. 2, 2021, the entire contents of which are incorporated herein by reference and for all purposes.

TECHNICAL FIELD

The present disclosure relates generally to various techniques for, among other things, using a service registry to pass application network metadata from a scalable application service platform to a network controller.

BACKGROUND

Wide area network (WAN) deployments can provide users with connectivity to services hosted on resources remote to the users. In traditional WAN deployments, routing policies are usually developed by a network administrator who has visibility of the network, as well as the services that the network is providing connectivity to. In this way, different routing policies can be developed that are tailored to the specific services the network is providing connectivity to. However, due to the proliferation in use of scalable application service platforms, developing routing policy for these networks can be challenging.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 is a flow diagram illustrating an example method for obtaining application network metadata from a service registry to derive network routing policies.

DESCRIPTION OF EXAMPLE EMBODIMENTS

Overview

Figure 1A:
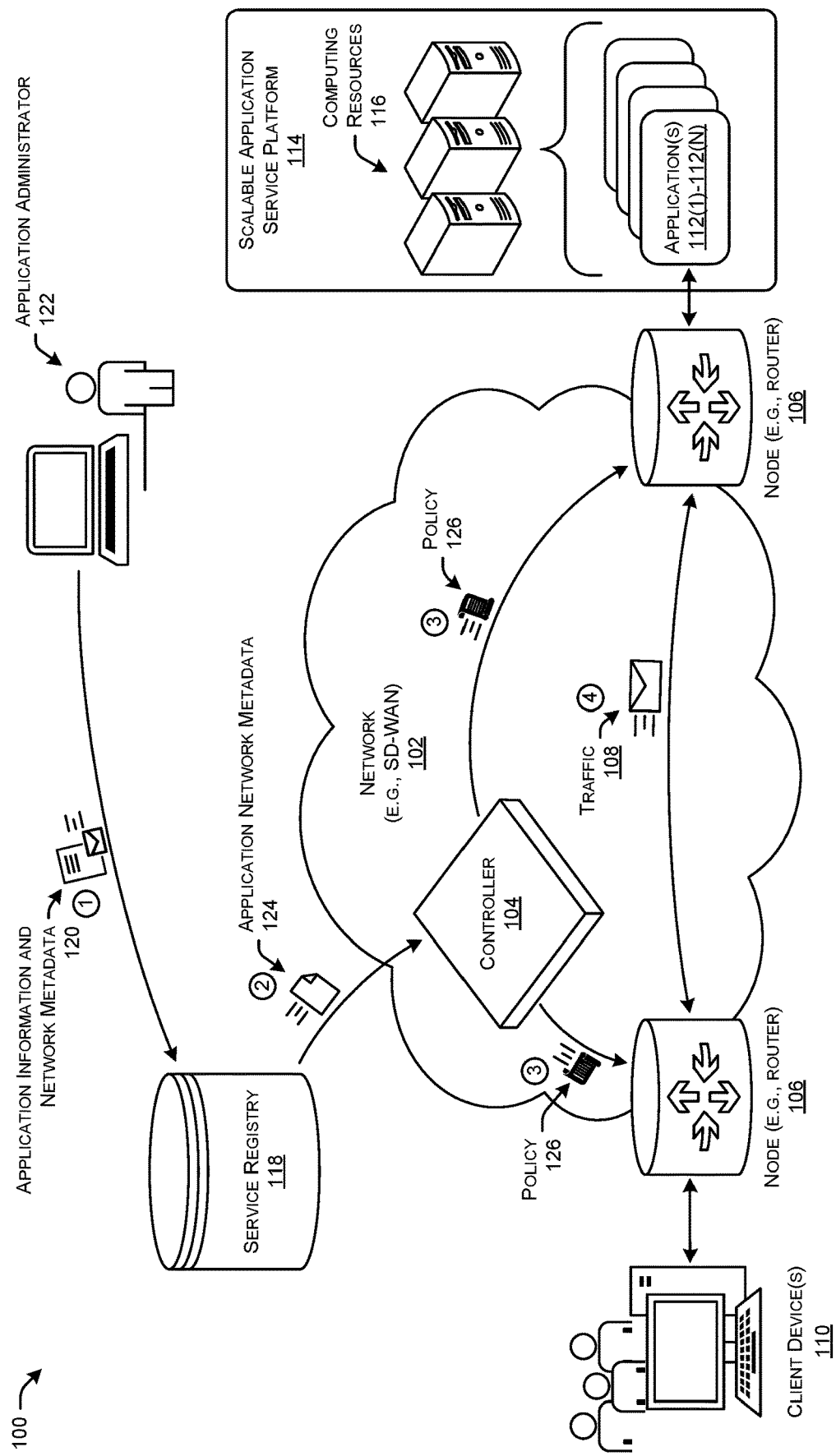
FIGS. 1A-1C are system-architecture diagrams illustrating an example architecture for performing some of the techniques described herein for obtaining application network metadata from a service registry to derive network routing policies.

This disclosure describes various technologies associated with using a service registry system to pass application network requirements to a network controller (e.g., SD-WAN controller) that can use the network requirements to render network policies. By way of example, and not limitation, a method according to the various technologies presented herein may include storing, in a service registry that is associated with a scalable application service platform, network metadata associated with traffic of an application hosted by the scalable application service platform. In some examples, the service registry may receive the network metadata from the scalable application service platform, from an administrator associated with the application, and the like. Additionally, or alternatively, the method may include obtaining, by a controller of a network and from the service registry, the network metadata associated with the traffic of the application. Based at least in part on the network metadata, the controller may determine a routing policy that is optimized for sending the traffic through the network. The method may further include sending an indication of the routing policy to a node of the network such that the traffic of the application is sent through the network according to the routing policy.

Additionally, the techniques described herein may be performed as a method and/or by a system having non-transitory computer-readable media storing computer-executable instructions that, when executed by one or more processors, performs the techniques described above.

Example Embodiments

As discussed above, wide area network (WAN) deployments can provide users with connectivity to services hosted on resources remote to the users. In traditional WAN deployments, routing policies are usually developed by a network administrator who has visibility of the network, as well as the services that the network is providing connectivity to. In this way, different routing policies can be developed that are tailored to the specific services the network is providing connectivity to. However, due to the proliferation in use of scalable application service platforms, developing routing policy for these networks can be challenging.

Accordingly, this disclosure describes various improvements in technologies that, among other things, provides for using a service registry system to pass application network requirements to a network controller (e.g., SD-WAN controller) that can use the network requirements to render network policies. For instance, the service registry system may receive and/or store application network requirements from a scalable application service platform (e.g., a container-orchestration system such as Kubernetes, Amazon ECS, Docker Swarm, Apache Messos, etc.), and the network controller may obtain the application network requirements from the service registry and use the application network requirements to render routing policies for application traffic.

Service registries have traditionally been leveraged for service discovery purposes. An exemplary service registry typically consists of a database-like system where information about services (e.g., applications) can be found. In the typical case of using a service registry for service discovery, this information generally includes the name of the service and the IP address (and in some cases the port) where the service can be found. Additionally, service registries commonly store multiple IP addresses (or IP address and port pairs) for a given service for load balancing and high availability. However, service registries have not been used to store network metadata (e.g., traffic profiles, latency requirements, QoS, etc.) associated with the services to drive network requirements, and specifically for defining software defined wide area network (SD-WAN) policy.

Using a service registry to enable an SD-WAN controller to retrieve application network requirements that can then be used to render SD-WAN policies has several advantages that result in an improvement in computer-related technology. For instance, with the introduction of the service registry, the application control components may not need to manage the application database because the service registry is doing so. This decouples functionality across different components, allows for separation of concerns, and improves scalability. Additionally, the solution of using the service registry is more scalable and shifts part of the load from the SD-WAN controller and/or the scalable application service platform to the service registry.

In some examples the service registry could be a domain naming system (DNS) server, a key-value database (e.g., etcd), or a proprietary service registry offered by a cloud provider. Additionally, and as will be discussed in further detail below, there are several ways the techniques for using a service registry to drive network requirements for applications can be implemented. This may depend on how the service registry is being populated and where the application network requirements are being specified. Various techniques and examples are described below.

By way of example and not limitation, a method according to the techniques disclosed herein may include receiving, by a service registry, network metadata associated with an application hosted by a scalable application service platform. In some examples, a user/administrator associated with the application may add both the network metadata and other information (e.g., application/service name, IP address(es) port(s), etc.) associated with the application directly to the service registry. Additionally, or alternatively, the scalable application service platform may automatically populate the service registry with the application information, and the user/administrator may, for instance, verify which applications are being registered into the service registry, as well as what relevant network metadata should be added or otherwise associated with those applications. As yet another additional or alternative example, the user/administrator may add the relevant network metadata directly to an application specification associated with the application in the scalable application service platform, which, for instance, may be done in the form of a YAML annotation as described in U.S. patent application Ser. No. 16/983,346. In this way, the user/administrator may select, in the application specification, what is the right network metadata that should be associated with the application, and then the scalable application service platform may register the application information and metadata into the service registry.

In some examples, after the network metadata and/or the information associated with the application is received and/or registered in the service registry, the service registry may store the network metadata and/or the information. In some examples, the network metadata associated with the application may include, for instance, a traffic profile associated with traffic of the application. The traffic profile may indicate a traffic content type (e.g., voice traffic, video traffic, data traffic, etc.) associated with the traffic. Additionally, or alternatively, the network metadata associated with the application may include a quality of service (QoS) associated with the application traffic, a frequency at which the application traffic is sent through the network, a minimum and/or maximum latency associated with the application traffic, and/or the like.

In some examples, a controller of a network may obtain the network metadata associated with the application from the service registry. In some instance, the network may be an SD-WAN that provides connectivity to applications of the scalable application service platform, and the controller may be an SD-WAN controller. In some examples, the controller may poll the service registry (e.g., at specific time intervals) to obtain the network metadata and/or any updated network metadata. Additionally, or alternatively, the controller may obtain the network metadata from the service registry in response to determining that the service registry has been updated. For instance, the controller may receive an indication from the service registry, the scalable application service platform, or a network administrator indicating that the service registry has been updated to include application network metadata.

In various examples, the controller may determine a routing policy that is optimized for sending the application traffic through the network. For instance, the controller may determine the routing policy based at least in part on the network metadata it received from the service registry. By way of example, the controller may determine that the application traffic is video traffic and render a routing policy such that the application traffic is handled according to a specific quality of service (QoS) that may be appropriate for video traffic. In some examples, the controller may provision the network with the routing policy. For instance, the controller may send an indication of the routing policy to one or more nodes (e.g., routers) of the network such that the application traffic is sent through the network according to the routing policy.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
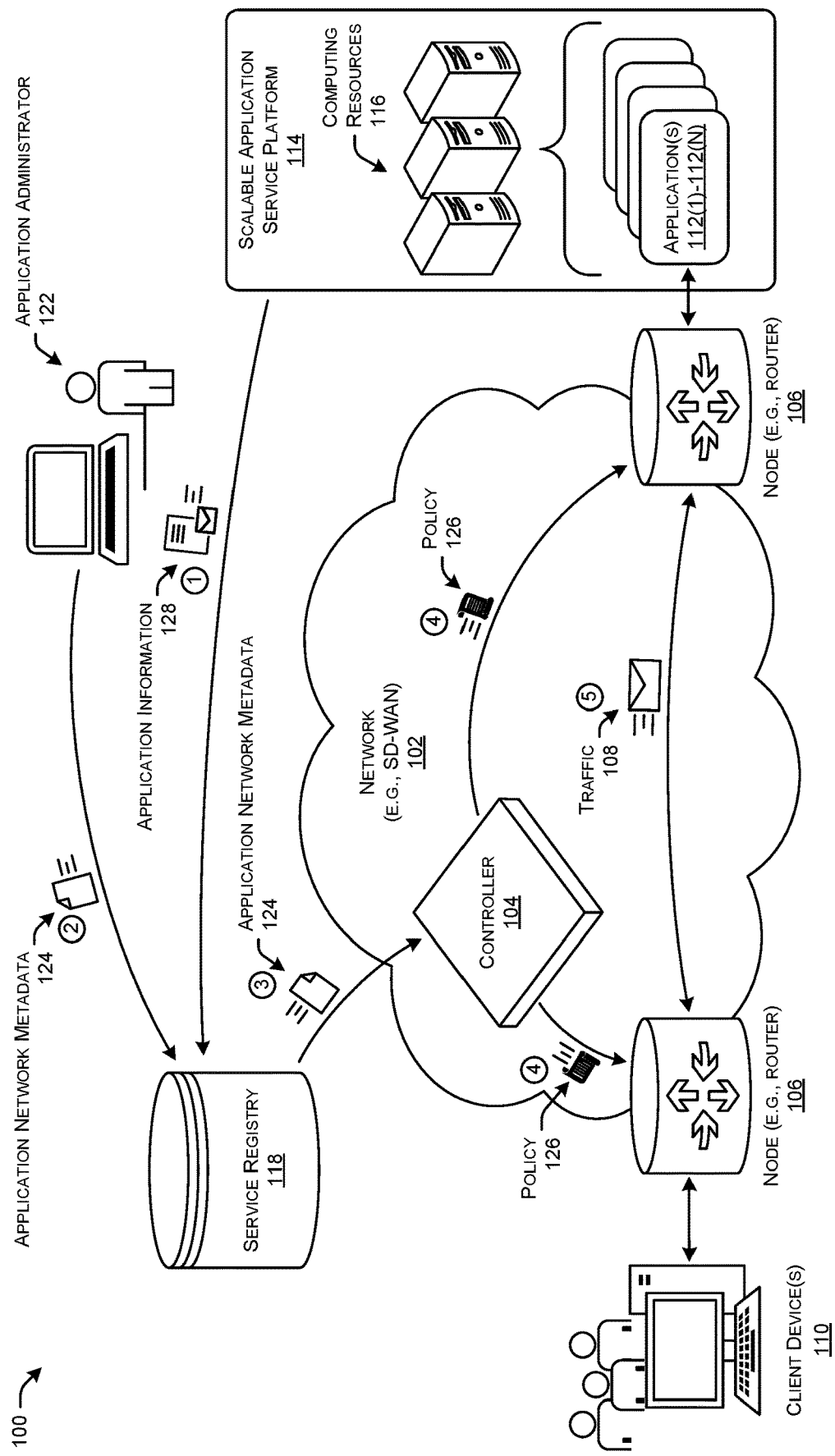
Figure 1C:
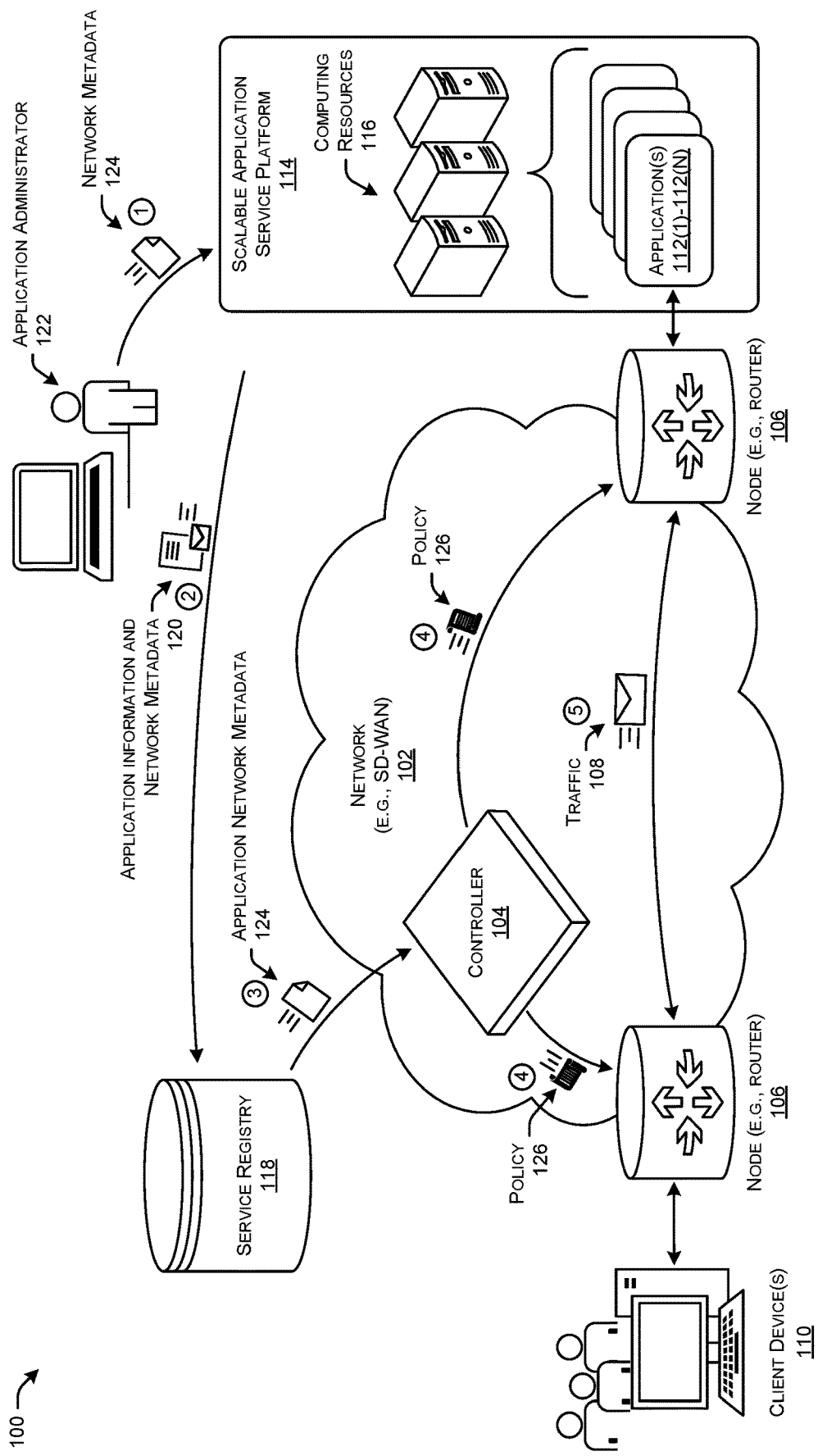

FIGS. 1A-1C are system-architecture diagrams illustrating an example architecture 100 for performing some of the techniques described herein for obtaining application network metadata from a service registry to derive network routing policies. The architecture 100 may include a network 102 having a network controller 104 and one or more nodes 106 that route traffic 108 through the network 102. For instance, the nodes 106 may route the traffic 108 between one or more client device(s) 110 and one or more applications 112(1)-112(N) (herein after referred to collectively as "applications 112") (where N represents any number greater than or equal to one) of a scalable application service platform 114. The scalable application service platform 114 may include multiple computing resources 116 for hosting the applications 112. The architecture 100 also includes a service registry 118.

The network 102 may be a software defined wide area network (SD-WAN) and the controller 104 may be an SD-WAN controller or orchestrator. The nodes 106 may be any physical device capable of forwarding packets. For instance, the nodes 106 may be routers, switches, general purpose computers, software nodes, gateways, and/or any other networking device capable of forwarding packets through the network 102. The network 102 may facilitate the communication of traffic 108 between the client devices 110 and the applications 112 of the application service 114. In some examples, the network 102 may include an overlay network and an underlay network. The overlay network may comprise a telecommunications network that is built on top of the underlay network and is supported by its infrastructure (e.g., the underlay network's physical devices, such as the nodes 106). The underlay network may comprise a software-defined/API-driven underlay provider (e.g., PacketFabric, Megaport, PCCW Global's ConsoleConnect, etc.). It should be appreciated that, although shown as residing in the same network 102 for simplicity, the network controller 104 may reside in a different network than the nodes 106. In some instances, the network controller 104 may additionally, or alternatively, reside in a different geographic location than the nodes 106. In some examples, the techniques disclosed herein are applicable to both public and private clouds.

The scalable application service platform 114 may host one or more third-party applications, virtual machines, containers, and the like using infrastructure (e.g., physical devices, such as the computing resources 116) of the scalable application service platform 114. For instance, the scalable application service platform 114 may comprise a container-orchestration system such as, for example, Kubernetes, Amazon ECS, Docker Swarm, Apache Messos, Intersight Kubernetes Services, and the like. The computing resources 116 of the scalable application service platform 114 may be used to host the applications 112. The computing resources 116 may comprise hardware servers, software servers that are running on computer hardware, processors, general purpose computers, and the like. In some examples, the scalable application service platform 114 may comprise multiple service platforms or data centers that are located in different geographical regions, different networks, etc. That is, although a single instance of the scalable application service platform 114 is shown in FIGS. 1A-1C for illustration purposes, it should be appreciated that the network 102 may facilitate communication of traffic 108 for multiple instances of the scalable application service platform 114. For instance, the computing resources 116 and/or the applications 112 may be distributed between different data centers associated with the scalable application service platform 114, different networks associated with the scalable application service platform 114, different zones of a cloud service provider, and the like.

As noted above, the architecture 100 also includes the service registry 118. The service registry may store information and network metadata associated with the applications 112. In some examples, the service registry 118 may be part of the network 102. In other examples, the service registry 118 may be associated with the scalable application service platform 114. In even further examples, the service registry 118 may be accessible to the network 102 and/or the scalable application service platform 114 as shown, but not necessarily a part of the same architecture or network of the network 102 and/or the scalable application service platform 114. In at least one example, the service registry 118 is offered as a service (e.g., as a FaaS). As discussed above, the service registry 118 may receive information and network metadata associated with applications in a number of ways. Some of these ways will now be discussed with reference to FIGS. 1A-1C. However, it is to be appreciated that other ways for the service registry 118 to receive the application information and network metadata are contemplated. Additionally, one technique for registering application information and network metadata in the service registry 118 may be combine with other techniques.

With respect to FIG. 1A, at "1" the service registry 118 receives application information and network metadata 120 from an application administrator 122. In some examples, the application information and network metadata 120 associated with the applications 112 may include, for instance, a traffic profile associated with traffic of the applications 112. The traffic profile may indicate a traffic content type (e.g., voice traffic, video traffic, data traffic, etc.) associated with the traffic. Additionally, or alternatively, the application information and network metadata 120 associated with the applications 112 may include quality of service (QoS) metrics associated with the application traffic 108, a frequency at which the application traffic 108 is sent through the network 102, a minimum and/or maximum latency associated with the application traffic 108, and/or the like.

At "2," the controller 104 of the network 102 may receive application network metadata 124 associated with one or more applications 112. Based at least in part on the application network metadata 124, the controller 104 may derive a policy 126 for how the traffic 108 is to be routed through the network 102 by the nodes 106. By way of example, the controller 104 may determine that the application traffic 108 is video traffic and derive the policy 126 such that the application traffic 108 is handled according to a specific quality of service (QoS) that may be appropriate for video traffic.

At "3," the controller 104 of the network 102 may provision the policy 126 on the nodes 106 of the network 102 such that the traffic 108 may be sent through the network 102 according to the policy 126. For instance, the controller 104 may send the policy 126 to the nodes 106 or otherwise provision the network 102 and/or the nodes 106 with the policy 126. At "4," the nodes 106 apply the policy 126 and send traffic 108 associated with the applications 112 through the network 102 according to the policy 126. For instance, the nodes 106 may receive the traffic 108, determine which application the traffic 108 is associated with, determine the policy 126 for that application's traffic 108, and send the traffic 108 through the network 102 according to that policy 126.

With reference to FIG. 1B, at "1," the scalable application service platform 114 may register an application 112 and its associated application information 128 with the service registry 118. That is, the scalable application service platform may send the application information 128 (e.g., application name, IP address, port, etc.) associated with an application 112 to the service registry 118, and the service registry 118 may store the application information 128. For instance, the scalable application service platform 114 may automatically populate the service registry 118 with the application information 128.

At "2," the application administrator 122 may verify which applications are being registered into the service registry 118, as well as what relevant network metadata 124 should be added or otherwise associated with those applications. Accordingly, the application administrator 122 may add the application metadata 124 to the service registry 118. At "3," the controller 104 of the network 102 may receive the application network metadata 124 associated with the one or more applications 112. Based at least in part on the application network metadata 124, the controller 104 may derive the policy 126 for how the traffic 108 is to be routed through the network 102 by the nodes 106.

At "4," the controller 104 may send the policy 126 to the nodes 106 or otherwise provision the network 102 and/or the nodes 106 with the policy 126. And, at "5," the nodes 106 apply the policy 126 and send traffic 108 associated with the applications 112 through the network 102 according to the policy 126.

With reference to FIG. 1C, at "1," the application administrator 122 may add the relevant network metadata 124 directly to application specifications associated with the applications 112 in the scalable application service platform 114. For instance, the network metadata 124 may be added to the application specification in the form of a YAML annotation. In this way, the application administrator 122 may select, in the application specification, what is the right network metadata 124 that should be associated with the applications 112. After the network metadata 124 is added to the application specification, at "2," the scalable application service platform 114 may register the application information and network metadata 120 into the service registry 118.

At "3," the controller 104 of the network 102 may obtain the application network metadata 124 associated with the one or more applications 112 from the service registry 118. Based at least in part on the application network metadata 124, the controller 104 may derive the policy 126 for how the traffic 108 is to be routed through the network 102 by the nodes 106.

At "4," the controller 104 may send the policy 126 to the nodes 106 or otherwise provision the network 102 and/or the nodes 106 with the policy 126. At "5," the nodes 106 apply the policy 126 and send traffic 108 associated with the applications 112 through the network 102 according to the policy 126.

FIG. 2 is a flow diagram illustrating an example method 200 for obtaining application network metadata from a service registry to derive network routing policies. The logical operations described herein with respect to FIG. 2 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 2 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 200 begins at operation 202, which includes receiving, at a service registry that is associated with a scalable application service platform, network metadata associated with traffic of an application hosted by the scalable application service platform. For instance, the service registry 118 may receive the application network metadata 124 associated with traffic 108 of an application 112(1) hosted by the scalable application service platform 114. In some examples, the service registry 118 may receive the network metadata from an application administrator 122. Additionally, or alternatively, the scalable application service platform 114 may automatically populate the service registry 118 with the application information, and the application administrator 122 may verify which applications 112 are being registered into the service registry 118 and associate the network metadata with those applications. As yet another additional or alternative example, the service registry 118 may receive the network metadata from the scalable application service platform 114, and the scalable application service platform 114 may have received the network metadata from the application administrator 122.

At operation 204, the method 200 includes obtaining, by a controller of a network and from the service registry, the network metadata associated with the traffic of the application. For instance, the controller 104 of the network 102 may obtain the application network metadata 124 associated with the traffic 108 from the service registry 118. In some examples, the controller 104 may poll the service registry 118 (e.g., at specific time intervals) to obtain the network metadata and/or any updated network metadata. Additionally, or alternatively, the controller 104 may obtain the network metadata from the service registry 118 in response to determining that the service registry 118 has been updated. For instance, the controller 104 may receive an indication from the service registry 118, the scalable application service platform 114, or a network administrator indicating that the service registry 118 has been updated to include the application network metadata.

At operation 206, the method 200 includes determining, by the controller and based at least in part on the network metadata, a routing policy that is optimized for sending the traffic through the network. For instance, the controller 104 may determine the policy 126 that is optimized for sending the traffic 108 through the network 102.

At operation 208, the method 200 includes sending an indication of the routing policy to a node of the network such that the traffic of the application is sent through the network according to the routing policy. For instance, the controller 104 may send the indication of the routing policy 126 to the one or more of the nodes 106, or otherwise provision the network 102 with the policy 126, such that the traffic 108 is sent through the network 102 according to the policy 126.

At operation 210, the method 200 includes receiving, at the node of the network, traffic of the application that is to be sent through the network. For instance, the node 106 of the network 102 may receive the traffic 108 that is to be sent through the network 102. And at operation 212, the method 200 includes sending the traffic through the network according to the policy. For instance, the node 106 may apply the policy 126 and send the traffic 108 through the network 102 (e.g., from one endpoint or edge node to another endpoint or other edge node).

Figure 3:
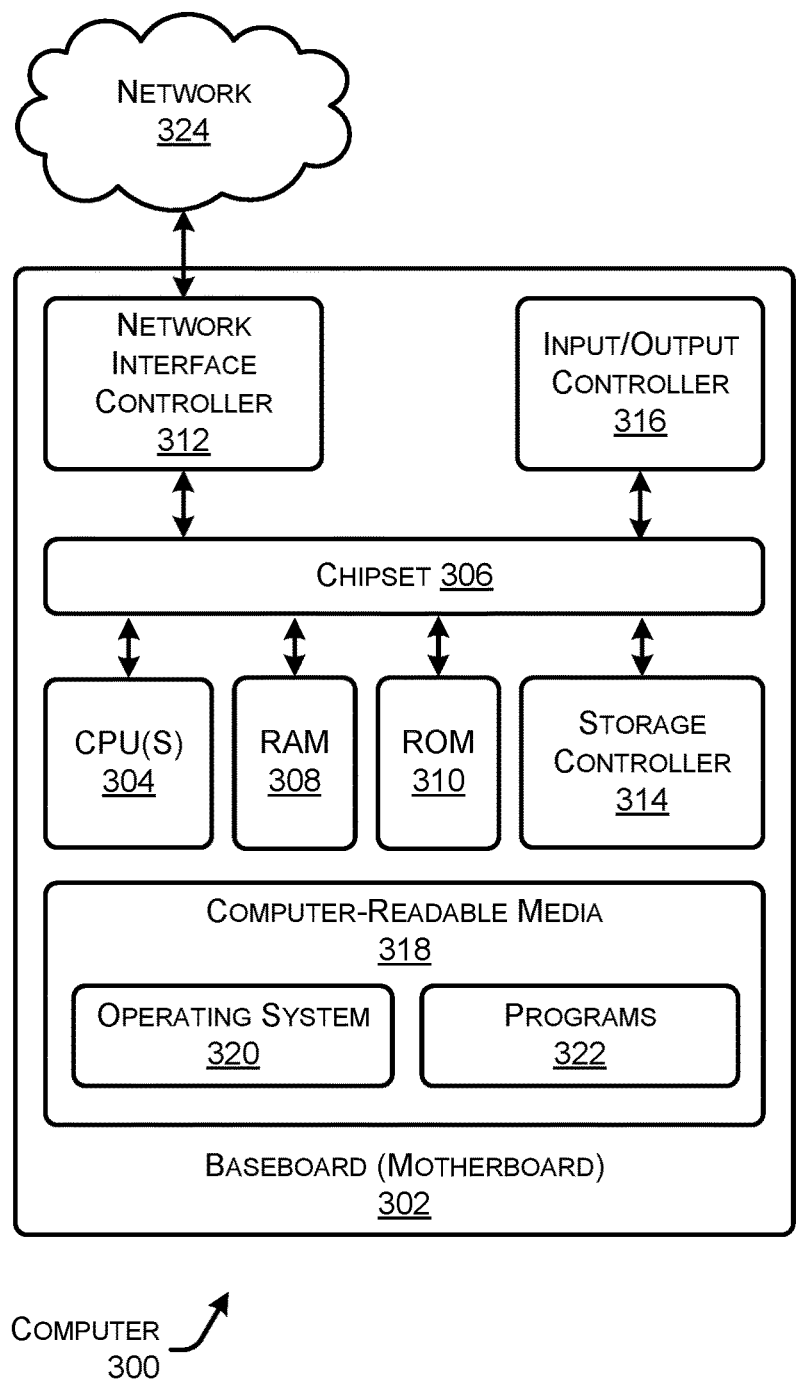
FIG. 3 is a computer architecture diagram showing an illustrative computer hardware architecture for implementing a computing device that can be utilized to implement aspects of the various technologies presented herein.

FIG. 3 is a computer architecture diagram showing an illustrative computer hardware architecture for implementing a computing device that can be utilized to implement aspects of the various technologies presented herein. The computer architecture shown in FIG. 3 illustrates a conventional server computer, network controller 104, computing resource 116, node 106, router, workstation, desktop computer, laptop, tablet, network appliance, e-reader, smartphone, or other computing device, and can be utilized to execute any of the software components presented herein.

The computer 300 includes a baseboard 302, or "motherboard," which is a printed circuit board to which a multitude of components or devices can be connected by way of a system bus or other electrical communication paths. In one illustrative configuration, one or more central processing units ("CPUs") 304 operate in conjunction with a chipset 306. The CPUs 304 can be standard programmable processors that perform arithmetic and logical operations necessary for the operation of the computer 300.

The CPUs 304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 306 provides an interface between the CPUs 304 and the remainder of the components and devices on the baseboard 302. The chipset 306 can provide an interface to a RAM 308, used as the main memory in the computer 300. The chipset 306 can further provide an interface to a computer-readable storage medium such as a read-only memory ("ROM") 310 or non-volatile RAM ("NVRAM") for storing basic routines that help to startup the computer 300 and to transfer information between the various components and devices. The ROM 310 or NVRAM can also store other software components necessary for the operation of the computer 300 in accordance with the configurations described herein.

The computer 300 can operate in a networked environment using logical connections to remote computing devices and computer systems through a network, such as the network 106. The chipset 306 can include functionality for providing network connectivity through a NIC 312, such as a gigabit Ethernet adapter. The NIC 312 is capable of connecting the computer 300 to other computing devices over the network 324 and/or network 102. It should be appreciated that multiple NICs 312 can be present in the computer 300, connecting the computer to other types of networks and remote computer systems. In some examples, the NIC 312 may be configured to perform at least some of the techniques described herein.

The computer 300 can be connected to a storage device 318 that provides non-volatile storage for the computer. The storage device 318 can store an operating system 320, programs 322, and data, which have been described in greater detail herein. The storage device 318 can be connected to the computer 300 through a storage controller 314 connected to the chipset 306. The storage device 318 can consist of one or more physical storage units. The storage controller 314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 300 can store data on the storage device 318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 318 is characterized as primary or secondary storage, and the like.

For example, the computer 300 can store information to the storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 300 can further read information from the storage device 318 by detecting the physical states or characteristics of one or more particular locations within the physical storage units.

In addition to the mass storage device 318 described above, the computer 300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 300. In some examples, the operations performed by the network 102 and or any components included therein, may be supported by one or more devices similar to computer 300. Stated otherwise, some or all of the operations performed by the network 102, and or any components included therein, may be performed by one or more computer devices 300 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 318 can store an operating system 320 utilized to control the operation of the computer 300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 318 can store other system or application programs and data utilized by the computer 300.

In one embodiment, the storage device 318 or other computer-readable storage media is encoded with computer-executable instructions which, when loaded into the computer 300, transform the computer from a general-purpose computing system into a special-purpose computer capable of implementing the embodiments described herein. These computer-executable instructions transform the computer 300 by specifying how the CPUs 304 transition between states, as described above. According to one embodiment, the computer 300 has access to computer-readable storage media storing computer-executable instructions which, when executed by the computer 300, perform the various processes described above with regard to FIGS. 1A-2. The computer 300 can also include computer-readable storage media having instructions stored thereupon for performing any of the other computer-implemented operations described herein.

The computer 300 can also include one or more input/output controllers 316 for receiving and processing input from a number of input devices, such as a keyboard, a mouse, a touchpad, a touch screen, an electronic stylus, or other type of input device. Similarly, an input/output controller 316 can provide output to a display, such as a computer monitor, a flat-panel display, a digital projector, a printer, or other type of output device. It will be appreciated that the computer 300 might not include all of the components shown in FIG. 3, can include other components that are not explicitly shown in FIG. 3, or might utilize an architecture completely different than that shown in FIG. 3.

The computer 300 may include one or more hardware processors 304 (processors) configured to execute one or more stored instructions. The processor(s) 304 may comprise one or more cores. Further, the computer 300 may include one or more network interfaces configured to provide communications between the computer 300 and other devices, such as the communications described herein as being performed by the source device 106 and network device 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 322 may comprise any type of programs or processes to perform the techniques described in this disclosure for obtaining application network metadata form a service registry to derive network policies. The programs 322 may enable the controller 104 and/or the service registry 118 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
obtaining, by a controller of a network and from a service registry that is associated with a scalable application service platform, network metadata associated with traffic of an application hosted by the scalable application service platform, wherein the network metadata is added to the scalable application service platform by an administrator associated with the application and the scalable application service platform is configured to register the network metadata into the service registry;
determining, by the controller and based at least in part on the network metadata, a routing policy that is optimized for sending the traffic through the network; and
sending an indication of the routing policy to a node of the network such that the traffic of the application is sent through the network according to the routing policy.

2. The method of claim 1, wherein the service registry is one of a domain naming system (DNS) server, a key-value database, or a service provider.

3. The method of claim 1, wherein the network metadata includes a traffic profile associated with the traffic, the traffic profile indicating a traffic content type associated with the traffic.

4. The method of claim 3, wherein the network metadata further includes one or more of a quality of service (QOS) associated with the traffic, a frequency at which the traffic is sent through the network, or a latency associated with the traffic.

5. The method of claim 1, wherein the network metadata is obtained by the controller at least partially in response to at least one of the application or the network metadata being registered with the service registry.

6. The method of claim 1, wherein the network metadata is obtained by the controller at least partially in response to the scalable application service platform registering the application with the service registry and the administrator associated with the application associating the network metadata with the application in the service registry.

7. The method of claim 1, wherein the network metadata is obtained by the controller at least partially in response to the scalable application service platform registering the application and the network metadata with the service registry.

8. A controller of a network comprising:
one or more processors; and
one or more non-transitory computer-readable media storing instructions that, when executed by the one or more processors, cause the controller to perform operations comprising:
obtaining, from a service registry that is associated with a scalable application service platform, network metadata associated with traffic of an application hosted by the scalable application service platform, wherein the network metadata is added to the scalable application service platform by an administrator associated with the application and the scalable application service platform is configured to register the network metadata into the service registry;
determining, based at least in part on the network metadata, a routing policy that is optimized for sending the traffic through the network; and
sending an indication of the routing policy to a node of the network such that the traffic of the application is sent through the network according to the routing policy.

9. The controller of claim 8, wherein the service registry is one of a domain naming system (DNS) server, a key-value database, or a service provider.

10. The controller of claim 8, wherein the network metadata includes a traffic profile associated with the traffic, the traffic profile indicating a traffic content type associated with the traffic.

11. The controller of claim 10, wherein the network metadata further includes one or more of a quality of service (QOS) associated with the traffic, a frequency at which the traffic is sent through the network, or a latency associated with the traffic.

12. The controller of claim 8, wherein the network metadata is obtained by the controller at least partially in response to at least one of the application or the network metadata being registered with the service registry.

13. The controller of claim 8, wherein the network metadata is obtained by the controller at least partially in response to the scalable application service platform registering the application with the service registry and the administrator associated with the application associating the network metadata with the application in the service registry.

14. The controller of claim 8, wherein the network metadata is obtained by the controller at least partially in response to the scalable application service platform registering the application and the network metadata with the service registry.

15. One or more non-transitory computer-readable media storing instructions that, when executed by one or more processors, cause the one or more processors to perform operations comprising:
   obtaining, by a controller of a network and from a service registry that is associated with a scalable application service platform, network metadata associated with traffic of an application hosted by the scalable application service platform, wherein the network metadata is added to the scalable application service platform by an administrator associated with the application and the scalable application service platform is configured to register the network metadata into the service registry;
   determining, by the controller and based at least in part on the network metadata, a routing policy that is optimized for sending the traffic through the network; and
   sending an indication of the routing policy to a node of the network such that the traffic of the application is sent through the network according to the routing policy.

16. The one or more non-transitory computer-readable media of claim 15, wherein the network metadata includes a traffic profile associated with the traffic, the traffic profile indicating a traffic content type associated with the traffic.

17. The one or more non-transitory computer-readable media of claim 16, wherein the network metadata further includes one or more of a quality of service (QOS) associated with the traffic, a frequency at which the traffic is sent through the network, or a latency associated with the traffic.

18. The one or more non-transitory computer-readable media of claim 15, wherein the network metadata is obtained by the controller at least partially in response to at least one of the application or the network metadata being registered with the service registry.

19. The one or more non-transitory computer-readable media of claim 15, wherein the network metadata is obtained by the controller at least partially in response to the scalable application service platform registering the application with the service registry and the administrator associated with the application associating the network metadata with the application in the service registry.

20. The one or more non-transitory computer-readable media of claim 15, wherein the network metadata is obtained by the controller at least partially in response to the scalable application service platform registering the application and the network metadata with the service registry.

* * * * *